(12) United States Patent
Ren et al.

(10) Patent No.: US 7,749,641 B2
(45) Date of Patent: Jul. 6, 2010

(54) SECONDARY LITHIUM ION CELL OR BATTERY, AND PROTECTING CIRCUIT, ELECTRONIC DEVICE, AND CHARGING DEVICE OF THE SAME

(76) Inventors: Xiaoping Ren, 17A No. 4 Building, Shijijiayuan, 45 Xiaoguanbeili, Anwai, Beijing, 100029 (CN); Jie Sun, 17A, No. 4 Building, Shijijiayuan, 45 Xiaoguanbeili, Anwai, Beijing, 100029 (CN)

( * ) Notice: Subject to any disclaimer, the term of this patent is extended or adjusted under 35 U.S.C. 154(b) by 1561 days.

(21) Appl. No.: 10/491,134

(22) PCT Filed: Sep. 28, 2002

(86) PCT No.: PCT/CN02/00696

§ 371 (c)(1),
(2), (4) Date: May 6, 2004

(87) PCT Pub. No.: WO03/030293

PCT Pub. Date: Apr. 10, 2003

(65) Prior Publication Data
US 2004/0209156 A1 Oct. 21, 2004

(30) Foreign Application Priority Data
Sep. 28, 2001 (CN) .............................. 01 1 41615

(51) Int. Cl.
*H01M 10/44* (2006.01)
*H01M 10/42* (2006.01)
*H01M 4/58* (2010.01)
*H02J 7/00* (2006.01)

(52) U.S. Cl. ................. 429/50; 429/49; 429/231.6; 320/137

(58) Field of Classification Search .......... 429/60, 429/231.95, 49, 50; 320/137
See application file for complete search history.

(56) References Cited

U.S. PATENT DOCUMENTS 5,260,148 A * 11/1993 Idota ....................... 429/307
5,487,960 A * 1/1996 Tanaka ..................... 429/332
5,604,418 A   2/1997 Andrieu et al.
6,558,848 B1 * 5/2003 Kobayashi et al. ......... 429/241
2003/0113613 A1 * 6/2003 Takeuchi et al. ............ 429/60

FOREIGN PATENT DOCUMENTS

| CN | 1135103 A | 11/1996 |
| CN | 1185860 A | 6/1998 |
| JP | 2000-270491 A | 9/2000 |

OTHER PUBLICATIONS

K. Mizushima et al., "$Li_xCo_2$ ($0<x<1$): A New Cathode Material for Batteries of High Energy Density", Mat. Res. Bull., vol. 15, pp. 783-789 1980.
G. Pistoia et al., Synthesis of Mn spinels from different polymorphs of $MnO_2$ Journal of Power Sources, 56 (1995) 37-43.
Lei Yongquan, "Materials for New Energy", 2000, p. 136.
Office Action dated Jun. 9, 2009, in corresponding Japanese Application No. 2003-533374, English Translation 3 pages.
Patent Abstracts of Japan Publication No. 2001-176559 dated Jun. 29, 2001, *Abstract*.
Patent Abstracts of Japan Publication No. 09-259928 dated Oct. 3, 1977, *Abstract*.
International Search Report, Dated: May 6, 2003.

* cited by examiner

*Primary Examiner*—Patrick Ryan
*Assistant Examiner*—Muhammad Siddiquee
(74) *Attorney, Agent, or Firm*—Stephen A. Bent; Foley & Lardner LLP

(57) ABSTRACT

The present invention provides a new method for improving capacity, average operating voltage and specific energy of a secondary lithium ion cell or battery. This method is achieved by means of properly adjusting the ratio between a positive material and negative material, which is calculated by theoretical specific energy, and properly increasing charge cut-off voltage. The present method can greatly increasing specific energy and average operating voltage of a secondary lithium ion cell without influence on recycle property of the cell. The present invention also provides a secondary lithium ion cell or battery practicing the method, a protecting circuit adapted for the secondary lithium ion cell or battery, a electronic device using said protecting circuit and said secondary lithium ion cell or battery, and a charging device for the secondary lithium ion cell or battery.

18 Claims, No Drawings

SECONDARY LITHIUM ION CELL OR BATTERY, AND PROTECTING CIRCUIT, ELECTRONIC DEVICE, AND CHARGING DEVICE OF THE SAME

TECHNICAL FIELD

The present invention relates to a new method for improving capacity, average operating voltage and specific energy of a secondary lithium ion cell or battery, and to a secondary lithium ion cell or battery prepared by using the method, a protecting circuit adapted for the secondary lithium ion cell or battery, a electronic device using the secondary lithium ion cell or battery, and a charging device for the secondary lithium ion cell or battery.

BACKGROUND ART

The industry of lithium ion cell develops quickly since SONY corporation of Japan invented and commercialized a secondary lithium ion cell. Up to 2000, the manufactures of lithium ion battery around the world compete allsidedly for improving the competitive power of their products mainly around the key issue, the capacity of lithium ion battery. At present, the improvement of capacity of commercialized secondary lithium ion battery generally depends on the increase of loading quantities of active substances (positive electrode materials and negative electrode materials). However, the limitation of the volume of lithium ion battery greatly restricts the increase of the battery capacity. For notably raising the capacity, the researches for the development of active substances (positive electrode materials and negative electrode materials) having higher specific energy are been conducting around the world, but so far, there is no notable breakthrough in this aspect for various technical difficulties.

In fact, the positive electrode materials and negative electrode materials used in the current secondary lithium ion battery have relatively higher theoretical capacity, and the problem merely lies in the lower actual utilization rate of said capacity. For example, lithium cobalt oxides as a positive electrode material of secondary lithium ion cell has a theoretical capacity of 248 mAh/g, while the actually used capacity of it is merely about 140 mAh/g, i.e., about half of said theoretic capacity is not utilized. This is mainly caused by the limitation of charge cut-off voltage commonly used in the art. At present, the charge cut-off voltage of single secondary lithium ion cell is limited to no more than 4.2 V, and this is well accepted as a technical requirement in the industry of manufacture of secondary lithium ion battery. Further, all lithium ion batteries in the markets around the world are manufactured under this technical requirement For example, the charge cut-off voltage is limited to below 4.2 V and the overcharge release voltage of its protection circuit is controlled below 4.15 V during the formation of single lithium ion cell. The reasons that the charge cut-off voltage being limited to below 4.2 V lie in the following opinions in the prior research results and documents: although the capacity and average operating voltage are improved by increasing the charge cut-off voltage, the positive electrode materials and the negative electrode materials will undergo structure change, the electrolyte may decompose, and the recycle property of the cell will be adversely affected when the charge cut-off voltage is greater than 4.2 V.

For instance, as to lithium cobalt oxides that is used as positive electrode material in the most commercial lithium ion batteries, the charge cut-off voltage is limited to below 4.2 V and the actual capacity is 120-140 mAh/g, i.e., about 50% of the theoretical capacity, although many documents indicate that the charge cut-off voltage can be over 4.2 V for a test cell using metallic lithium as counter electrode. In fact, according to MIZUSHIMAK et al., "A new cathode material for batteries of high energy density", Mater. Res. Bull., 1980, 15:783, the quantity of dedoped lithium ion increases with the increase of charge voltage, and the electrochemical capacity of lithium cobalt oxides increases accordingly. However, the study deems that the reversible charge-discharge voltage is about 4.3 V when metallic lithium is used as counter electrode, and when said voltage is higher than 4.3 V, the structure of lithium cobalt oxides changes and the lattice parameter C decreases from 4.4 nm to 4.0 nm, and thus the recycle life of cell is affected.

G. PISTOIA et al., J. Power Source, 56(1995), 37-43, deems that the structure the lithium cobalt oxides changes with the charge voltage, and the coexistence of monoclinic phase and hexagonal phase will appear when the charge voltage is over a certain value, which will spoil the recycle property of cell. The results of experiments showed that as to a test button cell having metallic lithium as negative electrode, the capacity of lithium cobalt oxides reaches 159 mAh/g when the charge cut-off voltage is 4.35 V, but it drops to 135 mAh/g after several cycles; and the capacity attenuates quickly when the charge cut-off voltage is 4.25 V. This document takes the opinion that lithium cobalt oxides maintains excellent recycle property and a capacity about 130 mAh/g only when the charge cut-off voltage is 4.15 V, and the corresponding voltages of monoclinic phase and hexagonal phase separately is 4.05 V and 4.17 V, i.e., both of them are below 4.2 V.

In addition, Lei Yongquan, "Materials for New Energy" (in Chinese), 2000, p136, discloses that the decomposition voltage of electrolyte solution using $LiPF_6$ as electrolyte and EC/DMC as mixture solvent is 4.2 V, and thus deems that the electrolyte solution will be decomposed and the recycle life will be affected when the charge cut-off voltage is above 4.2 V.

In 1990, Sony Corporation issued the lithium ion cell using coke as negative electrode, which has a charge cut-off voltage of not more than 4.20 V, and it is accepted as a common technical requirement of lithium ion cells thereafter.

The prior art deems:
1. The increase of charge cut-off voltage will change the structure of positive electrode material, which mainly exhibits at the following two aspects: one aspect is that the phase change, i.e., the coexistence of monodinic phase and hexagonal phase and the conversion between them may seriously affect the recycle life of lithium ion cell; and another aspect is that the change of lattice parameter may narrow the channel for passing lithium ions, squeeze the space occupied by lithium ions, jam the channel of lithium ions, and decrease the recycle property of lithium ion cell.
2. The elevated charge cut-off voltage may decompose the electrolyte solution, and the loss of electrolyte solution renders the transportation of lithium ion more difficult, and thus the recycle life of cell is seriously affected.

Therefore, it can be seen that the limitation of charge voltage restricts the actual utilization of active electrode materials. Under this condition, even if new positive electrode material and negative electrode material having higher specific energy are developed, the lithium ion cell cannot exhibit the best performance. Hence, it is urgently needed to provide a method that can improve the efficacy of active substances of lithium ion cell, consequently increase the capacity and average operating voltage, and maintain the better cell performance simultaneously.

SUMMARY OF INVENTION

As to the common opinion in the art that increasing the charge cut-off voltage above 4.2 V may greatly shorten the recycle life, the inventor of the present invention conducted a large number of experiments and studies to elevate the charge cut-off voltage and the capacity of cell. Contrary to this opinion, the inventor unexpectedly found that the efficacy of electrode active materials is greatly increased by increasing the charge cut-off voltage and property adjusting the ratio of positive electrode material to negative electrode material of single lithium ion cell. Consequently, the specific energy, capacity and average operating voltage of secondary lithium ion cell or battery are improved, while the performance of cell is substantially not changed. The present invention is fulfilled based on the aforesaid discovery.

It is one object of the present invention to provide a new method for improving capacity, average operating voltage and energy density of a secondary lithium ion cell or battery, wherein the charge cut-off voltage of the singe cell is greater than 4.2 V, and less than 5.8 V, and the ratio of positive electrode material to negative electrode material of the single cell is from 1:1.0 to 1:2.5, preferably from 1:1.16 to 1:2.5, as calculated by the specific capacity with the charge voltage limited to 4.2 V.

Another object of the present invention is to provide a secondary lithium ion cell or battery, wherein the single secondary lithium ion cell has an charge cut-off voltage of greater than 4.2 V but less than 5.8 V, and the ratio of positive electrode material to negative electrode material of the single cell is from 1:1.0 to 1:2.5, preferably from 1:1.15 to 1:2.5, as calculated by the specific capacity with the charge voltage limited to 4.2 V.

Yet another object of the present invention is to provide a protecting circuit adapted for the secondary lithium ion cell or battery, said protecting circuit having a first overcharging protection voltage of greater than 4.35 V, and an overcharge release voltage of greater than 4.15 V.

Yet another object of the present invention is to provide an electronic device using the secondary lithium ion cell or battery as power supply, said electronic device comprising a protecting circuit having a first overcharging protection voltage of greater than 4.35 V, and an overcharge release voltage of greater than 4.15 V.

Yet another object of the present invention is to provide a charging device for the secondary lithium ion cell or battery, said charging device controlling an charge cut-off voltage for the single lithium ion cell within the range of greater than 4.3 V but less than 5.8 V, preferably within the range from 4.3 V to 5.2 V, and more preferably from 4.3 V to 4.8 V.

EMBODIMENTS FOR CARRYING OUT THE PRESENT INVENTION

Being contrary to the common opinion in the art that the charge cut-off voltage shall be controlled below 4.2 V, the present inventor unexpectedly found that the capacity, specific energy and average operating voltage of the secondary lithium ion cell or battery were notably improved with little cost and with the other properties substantially unchanged, when investigating the effect of the elevated charge cut-off voltage on the cell performances with a large number of experiments of gradually elevating the charge cut-off voltage and appropriately adjusting the ratio of the positive electrode to the negative electrode of the single lithium ion cell. In the present invention, "lithium ion cell or battery" means that the present invention can be applied to either a single lithium ion cell, or a single lithium ion cell comprising a protecting circuit, or a battery comprising a number of single lithium ion cells, or a battery comprising a number of single lithium ion cell and protecting circuits. For briefness, sometimes it may also be termed as "lithium ion cell". In addition, "theoretical capacities of positive electrode and negative electrode" means the capacities of the positive electrode and the negative electrode calculated with an charge cut-off voltage set at 4.2 V.

The present inventor studied the relation between the charge cut-off voltage and the cell properties of secondary lithium ion cell by gradually elevating the charge cut-off voltage. For example, in the formation test for the commercial secondary single lithium ion cells and the self made single secondary lithium ion cells, the inventor elevated the charge cut-off voltage from 4.2 V to 4.30 V, 4.35 V, 4.40 V, 4.45 V and 4.6 V, and the results showed that when the charge cut-off voltage is, 4.3 V, 4.35 V and 4.40 V, the specific energy of cell increases by 6-20% than that under the charge cut-off voltage of 4.2 V, and the cells still maintain excellent recycle property, e.g., the capacity maintains more than 95% after 50 cycles, and more than 80% after 300 cycles. However, when the charge cut-off voltage is 4.45 V or high, the specific energy increases by about 30%, but the cell exhibits inferior recycle property, e.g., the capacity maintains merely 83.9% after 6 cycles.

For investigating the reasons of poor recycle property when the charge cut-off voltage is 4.45 V or high, the inventor adjusted the ratio of positive electrode material to negative electrode material, i.e., said ratio was adjusted within the range from 1:1.3 to 1:2.5 calculated according to the theoretical capacity under the charge cut-off voltage of 4.2 V, and then the single lithium ion cell having the adjusted ratios were tested by charging at an charge cut-off voltage of 4.45 V, 4.6 V, 4.8 V, 5.0 V, 5.2 V, 5.4 V, 5.6 V and 5.8 V, preferably said charging tests were conducted during the formation and test of the cells. Experimental results show that the specific energy was greatly increased under the charge cut-off voltage of 4.45 V or higher, and the corresponding recycle property was essentially not affected, when appropriate ratios of positive electrode material to negative electrode material were adopted.

In the present method, the elevating of the charge cut-off voltage is advantageously carried out during the formation and examination of the cell. The use of charge cut-off voltage of 4.20 V or high could increase the specific energy of cell, the capacity of positive electrode active material and the average operating voltage, and activate the cell so that the cell reaches its optimal working state with simultaneously achieving the effect of the formation, substantial improvement of the specific energy of commercial lithium ion cells, and imparting the competitiveness of lithium ion cells without altering the original process.

The mechanism of the above experimental results needs more researches. Without limited by any theory, the presumed reasons are as follows.

1. After the elevation of charge cut-off voltage, the amount of lithium ion dedoped from the positive electrode greatly increases, which renders an unmatched state to the original negative electrode material, and deposition of excessive lithium ions on the surface of negative electrode as metallic lithium, which jam part of the channel for passing lithium ions and result in the reduction of capacity and the deterioration of recycle property. The increase of the amount of negative electrode material meets the requirement of doping the relatively excessive lithium ions, and avoids the deposition of lithium ions on the surface of negative electrode as metallic lithium, and thus the maintaining properties (self-discharge properties) and recycle property are not affected. The suitable ratio of positive electrode material to negative electrode material will avoid the deposition of metallic lithium on the surface of negative electrode and the obstruction of channel for passing lithium ions, and consequently avoid the attenuation of capacity of cell. In particular, when the charge cut-off voltage of lithium ion cell is greater than 4.45 V, the negative electrode material of the ordinary commercial lithium ion cell is still more deficient, and the excessive lithium ions will deposit on the surface of negative electrode and form metallic lithium, which jams the channel for passing lithium ions and attenuates the capacity of cell. The great increase of content of negative electrode could reduce the attenuation of capacity of lithium ion cell caused by the increase of recycle times. According to this viewpoint, the inventor performed a lot of experiments, and the results prove the aforesaid assumption (see the Examples).

2. Within a certain range of charge cut-off voltage, the decomposition of little electrolyte solution brings about negligible effect on the recycle property of cell. The electrolyte having a high decomposition potential or an additive increasing the decomposition potential of electrolyte solution may bring about better performance. The decomposition of electrolyte solution mainly occurs on the positive electrode. Although prior documents disclosed that the decomposition voltage of the electrolyte solution comprising $LiPF_6$ as electrolyte and the mixture of EC/DMC as solvent on the surface of aluminum foil is 4.2 V, according to the results of experiments, this factor essentially does not affect the recycle life of the currently commercialized lithium ion cell. Namely, even though the electrolyte solution decomposes under a voltage higher than 4.2 V, the electric energy is mainly converted into chemical energy and the electric energy involved in the decomposition of electrolyte is very little, thus, this decomposition of electrolyte can hardly affect the recycle life of the lithium ion cell. As to the voltages above the decomposition voltage, such as above 5.0 V, the substance A can be added into the electrolyte solution, or the electrolyte solution B having a higher decomposition voltage can be used. The decomposition potentials of the components of electrolyte solution commonly used in the art are depicted in Table 1. It can be seen that the lowest decomposition voltage of solvent is above 4.5 V.

TABLE 1

Decomposition potentials of various mixture electrolyte solutions

| Mixture solvent | Solute | | |
| --- | --- | --- | --- |
| | $LiClO_4$ Decomposition potentials (V) | $LiAsF_6$ Decomposition potentials (V) | $LiPF_6$ Decomposition potentials (V) |
| PC:DME | 4.51 | 4.72 | |
| PC:DEC | 4.5 | 4.5 | |
| PC:EC | | 4.5 | |
| PC:EC:DME | 4.5 | 4.62 | |
| PC:DEC:2MLF | | 4.52 | |
| EC:DEC | | 4.9 | 4.8 |
| EC:DMC | | | 4.9 |
| B | | | 5.9 |

3. As to the reason that the lithium ion cell does not appear attenuation of capacity caused by the change of structure as mentioned in the prior documents when the charge cut-off voltage is above 4.2 V, it may be due to that: after the ithium ions first intercalaton into anode, there is about 10% lithium ions which form a SEI film, so that the actual space of the lithium ions is more than the space that should be occupied by the lithium ions, i.e., the space available to the lithium ions exceeds about 10% of the space needed by the activated lithium ions, thus, although the elevation of the charge voltage changes the structure of positive electrode material, i.e., reduces the lattice parameter, the recycle life is not affected because the space occupied by the actually deintercalation and intercalation lithium ions is less than the space actually possessed by the positive electrode material, and thus the change of structure in a certain extent will not obstruct the dedoping and doping of lithium ions and will not affect the recycle life of cell. Using positive material more stable in structure with respect to the change of charge voltage exhibit better performance. Although the positive electrode generates inert substance poor in conductivity when overcharged, according to the results of experiments, it occurs only when the lithium ions completely dedoped. For example, as to lithium cobalt oxides, lithium nickel oxides, and doped lithium cobalt oxides and lithium nickel oxides, when they are charged with 3C5A current, the experimental data show that only when the voltage is about 6.20 V the lithium ions completely dedoped, with releasing a lot of oxygen, and forming an insulator. As to lithium manganese oxides and doped lithium manganese oxides, the lithium ions completely dedoped under the same charge current when the cell potential is about 6.50 V. Generally, the specific energy of positive electrode active substance actually used in the present commercialized lithium ion cell is far less than the theoretical capacity thereof, and even if the charge cut-off voltage is elevated up to 5.8 V, the theoretical capacity cannot be achieved under the proviso that suitable formulation is used, thus, the cell is not overcharged. Therefore, the present method still enjoys satisfactory safety.

4. Besides the aforementioned factors, the self-discharge of cell, the selection of current collector, and the formation of passive film all affect the recycle life of lithium ion cell, while these factors mainly depend on the preparation of lithium ion cell. It is believable that if the optimal processes are used, the capacity, average operating voltage and specific energy can be greatly improved, while the recycle life and other properties of the cell are not affected.

Hence, the present invention is to provide a novel method for effectively improving the specific energy and average operating voltage of secondary lithium ion cell or battery. Contrary to the prior art, the present method elevates the charge cut-off voltage to greater than 4.2 V but less than 5.8 V, and control the ratio of positive electrode material to negative electrode material of single lithium ion cell at 1:1.0 to 1:2.5 calculated by theoretical specific energy, so as to increase the efficacy of electrode active materials, to improve the capacity, energy density and output voltage of cell, and to maintain the performance of cell. For achieving the better effect, the charge cutoff voltage used in the present invention is preferably 4.3-5.2 V, and more preferably 4.2-4.8 V. In addition, the ratio of positive electrode material to negative electrode material of cell is 1:1.0 to 1:2.5 calculated by the theoretical capacity under the charge cut-off voltage of 4.2 V. The experiments showed that when the process parameters go beyond the aforesaid ranges, the properties of cell are deteriorated and unsuitable for use. When the ratio of positive electrode material to negative electrode material is less than 1.0 calculated by theoretical capacity, the recycle life of cell is excessively reduced, while when said ratio is greater than 2.5, the volume efficiency of cell is notably reduced. Further, when the charge cut-off voltage is greater than 5.8 V, the cell has inferior properties and is unsuitable for use.

It can be seen that the capacity, specific energy and average operating voltage of secondary lithium ion cell can be greatly improved by elevating the charge cut-off voltage and by appropriately adjusting the ratio of positive electrode material to negative electrode material calculated by the theoretical capacity, while the recycle property of cell is not affected, which renders the lithium ion cell possess more commercial value and broader application range. Hence, it can also be seen that the present method further optimizes the utilization of positive electrode material, and thus is an economical method. The inventors believe that the method can still be used to positive and negative electrode materials having higher specific energy developed in future, and achieves the optimal effect.

In addition, it is worthy to be noted that the used in the present method is not such that the cell works in extreme conditions. After repetitive experiments, the inventor never found that the present method increased the probability of damage of cell. Hence, the present method is also a safe method.

Further, the present invention further provides a novel secondary cell or battery having improved specific energy and average operating voltage. Contrary to the prior art, the charge cut-off voltage of the single cell of said secondary cell or battery is greater than 4.2 V but less than 5.8 V, and the ratio of positive electrode material to negative electrode material calculated by the theoretical capacity under the charge cut-off voltage of 4.2 V is 1:1.0 to 1:2.5. As compared to the prior secondary lithium ion cell or battery cell, the capacity, energy density and output voltage of the present secondary lithium ion cell or battery are greatly improved, while its recycle life is equivalent to that of the prior art cell. For achieving better effect, the aforesaid charge cut-off voltage used in the present invention is preferably in the range from 4.3 V to 5.2 V, more preferably in the range from 4.3 V to 4.8 V. In addition, the ratio of positive electrode material to negative electrode material of said singe lithium ion cell, which is calculated by the theoretical capacity under the charge cut-off voltage of 4.2 V, is 1:1.5 to 1:2.5. Experiments showed that when the process parameters go beyond the aforesaid ranges, the properties of cell are deteriorated and unsuitable for use. When the ratio of positive electrode material to negative electrode material is less than 1.0 calculated by theoretical capacity, the recycle life of cell is excessively reduced, while when said ratio is greater than 2.5, the volume efficiency of cell is notably reduced. Further, when the charge cut-off voltage is greater than 5.8 V, the cell has inferior properties and is unsuitable for use.

Moreover, it is important that the present method not only can be used to the secondary lithium ion cell or battery of the present invention, but also can be used to the secondary lithium ion cell or battery prepared according to the method of the prior art, such as the present commercialized secondary lithium ion cell or battery.

Without limitation, the following contents more concretely introduce the secondary lithium ion cell used in the present method. Generally, a secondary lithium ion cell comprises a positive electrode, a negative electrode, a non-aqueous electrolyte, and a separator the positive electrode and the negative electrode. The non-aqueous electrolyte can be obtained by dissolving lithium-containing metal salt, such as $LiPF_6$, as electrolyte into a non-aqueous solvent, such as ethylene carbonate or dimethyl carbonate. The separator can be insoluble in said non-aqueous solvent, and is a porous membrane made of polyethylene or polypropylene resin. The ratio of positive electrode material to negative electrode material is calculated by theoretical capacity under the charge cut-off voltage of 4.2 V.

Positive Electrode

The positive electrode is prepared e.g., by dispersing positive electrode active material, conducting agent and binder in a suitable solvent to form a suspension, coating said suspension on a current collector, such as aluminum foil, then drying and pressing the coated current collector by rollers.

The positive electrode active substance used in the present invention is lithium-containing compound. Although the examples use lithium cobalt oxides (lithium cobalt composite oxides), lithium manganese oxides and lithium nickel oxides as positive electrode material, it is understood that the practice of the present invention is not limited to the specific properties of said lithium-containing composite oxides, rather a wide range of positive electrode active substance can be used in the present invention. The common feature of these oxides is that their specific energy increases with the increase of voltage, and the experiments (see the examples) prove that the capacity of cell is greatly elevated when the charge cut-off voltage is above 4.20 V, while the other properties of cell are not affected. The present invention can also be used to lithium ion cells having doped lithium-containing compound as positive electrode active material, such as various positive electrode active materials containing various oxides and sulfides, such as lithium cobalt composite oxides, lithium manganese composite oxides, lithium nickel composite oxides, lithium nickel cobalt composite oxides, lithium manganese cobalt composite oxides, and vanadium oxides. Among these positive electrode materials, lithium cobalt composite oxides (such as $LiCoO_2$), lithium manganese composite oxides (such as $LiMn_2O_4$), lithium nickel composite oxides (such as $LiNiO_2$), lithium nickel cobalt composite oxides (such as $LiNi_{1-x}Co_xO_2$), and lithium manganese cobalt composite oxides (such as $LiMn_xCo_{1-x}O_2$), which have higher cell voltage, are preferably used. In addition, the present invention can use conventional conducting agent and binder, and the mixture ratio for each components in the positive electrode active material can be those well known in the art.

Separator

The separator used in the present invention is a separator well known in the art. For example, it can be a non-woven fabric made of synthetic resin, polyethylene porous membrane or polypropylene porous membrane, and a material formed by like materials.

Negative Electrode

The negative electrode is prepared e.g., by dispersing negative electrode active material, conducting agent and binder in a suitable solvent to form a suspension, coating said suspension on a current collector, such as copper foil, nickel foil or stainless steel foil, then drying and pressing the coated current collector by rollers.

The negative electrode active material used in the present invention is a carbonaceous or non-carbonaceous substance capable of doping and dedoping lithium ion, including, such as, lithium alloy (such as $Li_4Ti_5O_{12}$), metal oxide (such as amorphous tin oxide, $WO_2$ and $MoO_2$), $TiS_2$ and carbonaceous substance capable of absorbing and desorbing lithium ions, and especially, the carbonaceous substance is the desired negative electrode active material.

The carbonaceous substance used in the present invention includes: graphite, non-oriented graphite, coke, carbon fiber, spherical carbon, carbon sintered from resin, carbon grown in gas phase, and carbon nanometer tube. Since the negative electrode comprising the aforesaid specific carbon fiber or spherical carbon exhibits high charge efficiency, mesophase asphalt based carbon fiber or mesophase asphalt based spherical carbon is preferably used as the carbonaceous substance. The mesophase asphalt based carbon fiber or mesophase asphalt based spherical carbon can be obtained according to the conventional method.

Without any specific restriction, non-aqueous electrolytes and shells of the type well known in the art can be used in the present invention. For example, use can be made of non-aqueous electrolyte is a liquid non-aqueous electrolyte prepared by dissolving electrolyte in a non-aqueous solvent, a gel non-aqueous electrolyte prepared by mixing polymer, non-aqueous solvent and solute, or a solid polymer non-aqueous electrolyte, etc.

The cell structure can be a helical structure formed by wrapping anode and cathode with a separator in between, or a laminate structure formed by stacking anode and cathode with a separator in between, but the structure of cell is not limited to a certain shape, and it can be cylinder shape, prism shape, coin shape, button shape and so on.

Except voltage, all process parameters for charge and discharge are commonly used in the art.

Since the voltage used in the present invention is higher than the voltage currently used in the art, the necessary modification is made to the protecting circuit or relevant devices and equipments comprising said circuit which are used in the present method and for the present secondary lithium ion cell. The type and structure of the protecting circuit for said secondary lithium ion cell or battery shall not be specifically restricted, i.e., the well known structure can be used, provided that the first overcharging protection voltage is greater than 4.35 V, and the overcharge release voltage is greater than 4.15 V, preferably the first overcharging protection voltage is greater than 4.45 V, and the overcharge release voltage is greater than 4.25 V.

In addition, the electronic device of the present invention using a secondary lithium ion cell or battery as energy source shall not be specifically limited. The device can be a common structure, provided that said electronic device containing a single lithium ion cell having a first overcharging protection voltage of greater than 4.35 V, and an overcharge release voltage of greater than 4.15 V, preferably a first overcharging protection voltage of greater than 4.45 V, and the overcharge release voltage of greater than 4.25 V. The electronic device of the present invention includes: notebook type computer, PDA, electromotive bicycle, and electromotive automobile etc.

Similarly, the charging device for the secondary lithium ion cell or battery of the present invention can be a charging device having any type and structure with the proviso that said charging device controls the charge cut-off voltage of the single lithium ion cell within a range from 4.3 V to 5.8 V, preferably from 4.3 V to 5.2 V, more preferably from 4.3 V to 4.8 V.

EXAMPLES

The present invention is described in detail hereinafter according to the results of specific experiments.

Preparation of Single Lithium Ion Cell

In one of examples of the present invention, the process for preparing the single lithium ion cell is described as follows.

Said single lithium ion cell uses copper foil as current collector of negative electrode, aluminum foil as current collector of positive electrode, lithium cobalt oxides as positive electrode active substance, and MCMB as negative electrode active substance. The type of cell is prismatic 653466. The lithium cobalt oxides is mixed with 7% PVDF as binder and 5% conductive carbon black, and then is added into NMP solvent in a ratio of 1:1. The negative electrode material is directly mixed with 10% PVDF as binder in a ratio of 1:1 to form a slurry. The positive electrode slurry is coated on the positive electrode current collector, and the negative electrode slurry is coated on the negative electrode current collector, and then they are dried and pressed, and treated by coating. The coating slurry for the positive electrode is prepared by dissolving a mixture of carbonaceous material and PVDF in an organic solvent, which is coated on the dried positive electrode. The coated positive electrode is pressed and baked again.

The dried positive electrode and negative electrode are connected to a lead, and a separator made of PP is inserted between them. After being wrapped by a winder to form an assembly, and this assembly is mounted into a cell shell made of aluminum or steel material. The shell and the cover are soldered together by laser soldering. An electrolyte solution is injected into the cell under relative humidity less than 1.5%, wherein said electrolyte solution contains a mixture solvent of EC:DEC:DMC=1:1:1, and an electrolyte of 1M $LiPF_6$. The cell is immediately sealed after the injection.

Example 1

Several lithium ion cells of quadrate type 653466 are prepared according to the above method, and they each have a ratio of positive electrode material to negative electrode material of 1:1.0, 1:1.05, 1:1.1, 1:1.15, 1:1.2, 1:1.25 and 1:1.3. After formation and test using an charge cut-off voltage of 4.20 V, these cells have an arithmetic mean capacity of 1113 mAh, a weight specific energy of 102 Wh/kg, an average operating voltage of 3.70 V, and maintain 85.72% of capacity after 400 recycles.

Example 2

Several lithium ion cells of quadrate type 653466 are prepared according to the above method, and they each have a ratio of positive electrode material to negative electrode material of 1:1.0, 1:1.05, 1:1.1, 1:1.15, 1:1.2, 1:1.25 and 1:1.3. After formation and test using an charge cut-off voltage of 4.30 V, these cells have an arithmetic mean capacity of 1206 mAh, a weight specific energy of 113 Wh/kg, an average operating voltage of 3.75 V, and maintain 86.31% of capacity after 400 recycles.

Example 3

Several lithium ion cells of quadrate type 653466 are prepared according to the above method, and they each have a ratio of positive electrode material to negative electrode material of 1:1.0, 1:1.05, 1:1.1, 1:1.15, 1:1.2,1:1.25 and 1:1.3. After formation and test using an charge cut-off voltage of 4.35 V, these cells have an arithmetic mean capacity of 1253 mAh, a weight specific energy of 119 Wh/kg, an average operating voltage of 3.8 V, and maintain 84.79% of capacity after 400 recycles.

Example 4

Several lithium ion cells of quadrate type 653466 are prepared according to the above method, and they each have a ratio of positive electrode material to negative electrode material of 1:1.0, 1:1.05, 1:1.1, 1:1.15, 1:1.2, 1:1.25 and 1:1.3. After formation and test using an charge cutoff voltage of 4.40 V, these cells have an arithmetic mean capacity of 1302 mAh, a weight specific energy of 123 Wh/kg, an average operating voltage of 3.80 V, and maintain 83.93% of capacity after 400 recycles.

Example 5

Lithium ion cells of quadrate type 653466 are prepared according to the above method, and it has a ratio of positive electrode material to negative electrode material of 1:1.45. After formation and test using an charge cut-off voltage of 4.45 V, said cell has a capacity of 1365 mAh, a weight specific energy of 129 Wh/kg, an average operating voltage of 3.85 V, and maintain 84.56% of capacity after 400 recycles.

Example 6

Lithium ion cells of quadrate type 653466 are prepared according to the above method, and it has a ratio of positive electrode material to negative electrode material of 1:1.60. After formation and test using an charge cut-off voltage of 4.60 V, said cell has a capacity of 1692 mAh, a weight specific energy of 165 Wh/kg, an average operating voltage of 3.9 V, and maintain 85.13% of capacity after 400 recycles.

Example 7

Lithium ion cells of quadrate type 653466 are prepared according to the above method, and it has the ratio of positive electrode material to negative electrode material of 1:1.7. After formation and test using an charge cut-off voltage of 4.80 V, said cell has a capacity of 1824 mAh, a weight specific energy of 178 Wh/kg, an average operating voltage of 3.9 V, and maintain 83.92% of capacity after 400 recycles.

Example 8

Lithium ion cells of quadrate type 653466 are prepared according to the above method, and it has the ratio of positive electrode material to negative electrode material of 1:1.9, wherein the substance A having high decomposition potential is added, or the electrolyte solution B having high decomposition potential is used. After formation and test using an charge cut-off voltage of 5.00 V, said cell has a capacity of 1894 mAh, a weight specific energy of 186 Wh/kg, an average operating voltage of 3.93 V, and maintain 81.23% of capacity after 400 recycles.

Example 9

Lithium ion cells of quadrate type 653466 are prepared according to the above method, wherein 15% of another lithium-containing compound C is added into the positive electrode slurry, and the ratio of positive electrode material to negative electrode material is 1:2.2. After formation and test using an charge cut-off voltage of 5.20 V, said cell has a capacity of 1962 mAh, a weight specific energy of 194 Wh/kg, an average operating voltage of 3.96 V, and maintain 81.19% of capacity after 400 recycles.

Example 10

Lithium ion cells of quadrate type 653466 are prepared according to the above method, wherein 15% of another lithium-containing compound C is added into the positive electrode slurry, and the ratio of positive electrode material to negative electrode material is 1:2.3. After formation and test using an charge cutoff voltage of 5.40 V, said cell has a capacity of 1968 mAh, a weight specific energy of 195 Wh/kg, an average operating voltage of 3.96 V, and maintain 81.19% of capacity after 400 recycles.

Example 11

Lithium ion cells of quadrate type 653466 are prepared according to the above method, wherein 15% of another lithium-containing compound C is added into the positive electrode slurry, and the ratio of positive electrode material to negative electrode material is 1:2.4. After formation and test using an charge cut-off voltage of 5.60 V, said cell has a capacity of 1970 mAh, a weight specific energy of 195 Wh/kg, an average operating voltage of 3.96 V, and maintain 79.97% of capacity after 400 recycles.

Example 12

Lithium ion cells of quadrate type 653466 are prepared according to the above method, wherein 15% of another lithium-containing compound C is added into the positive electrode slurry, and the ratio of positive electrode material to negative electrode material is 1:2.5. After formation and test using an charge cut-off voltage of 5.80 V, said cell has a capacity of 1972 mAh, a weight specific energy of 195 Wh/kg, an average operating voltage of 3.96 V, and maintain 78.82% of capacity after 400 recycles.

Example 13

Lithium ion cells of quadrate type 653466 are prepared according to the above method, wherein 15% of another lithium-containing compound C is added into the positive electrode slurry, and the ratio of positive electrode material to negative electrode material is 1:2.6. After formation and test using an charge cut-off voltage of 5.90 V, said cell has a capacity of 1565 mAh, and maintain 12.31% of capacity after 15 cycles.

It can be seen from the above examples that when the charge voltage is elevated above 4.2 V, the capacity, operating voltage and weight specific energy increase with the elevation of the charge voltage; and when the charge voltage is elevated above 4.45 V, the capacity, operating voltage and weight specific energy continuously further increase with the elevation of the charge voltage and of the ratio of positive electrode material to negative electrode material; but when the charge voltage is greater than 5.8 V, the properties of cell decrease.

Examples 14-18

Using lithium manganese oxide as positive electrode active material. Lithium ion cells are prepared according to the aforesaid method, wherein the positive electrode slurry consists of 4 g lithium manganese oxide, 0.6 g carbon black, 0.32 g PVDF, and 4.92 g NMP, and the negative electrode slurry consists of 2.6 g MCMB, 0.26 g PVDF, and 3.0 g NMP. The cell is a quadrate type 653466 lithium ion cell. The data of experiments are depicted in Table 2.

TABLE 2

| Example | Charge cut-off voltage (V) | Processing change | Recycle property | Capacity (mAh) |
|---|---|---|---|---|
| 14 | 4.20 | — | Maintaining 84.23% after 400 recycles | 375 |
| 15 | 4.30 | — | Maintaining 85.12% after 400 recycles | 405 |
| 16 | 4.60 | The ratio of positive electrode material to negative electrode material is 1:1.6. | Maintaining 83.45% after 400 recycles | 575 |
| 17 | 5.80 | The ratio of positive electrode material to negative electrode material is 1:2.5, and substance A is added into the electrolyte solution. | Maintaining 82.83% after 400 recycles | 567 |
| 18 | 5.90 | The ratio of positive electrode material to negative electrode material is 1:2.7, and substance A is added into the electrolyte solution. | Maintaining 54.23% after 30 cycles | 312 |

Examples 14-18 show that when using lithium manganese oxide as positive electrode active material, the cells obtain the results similar to that of examples 1-13. Namely, when the charge voltage is elevated above 4.2 V, the capacity, operating voltage and weight specific energy increase with the elevation of the charge voltage; and when the charge voltage is elevated above 4.45 V, the capacity, operating voltage and weight specific energy continuously increase with the elevation of the charge voltage and of the ratio of positive electrode material to negative electrode material; but when the charge voltage is greater than 5.8 V, the properties of cell decrease.

Examples 19-23

Using lithium nickel oxide as positive electrode active material. Secondary lithium ion cells are prepared according to the aforesaid method for preparing the lithium ion cells using lithium cobalt oxide as positive electrode active material, wherein the positive electrode slurry consists of 4 g lithium nickel oxide, 0.2 g carbon black, 0.2 g PVDF, and 4.80 g NMP, and the negative electrode slurry consists of 3.5 g MCMB, 0.35 9 PVDF, and 4.0 g NMP. The cell is a quadrate type 063048 lithium ion cell. The data of experiments are depicted in Table 3.

TABLE 3

| Example | Charge cut-off voltage (V) | Processing change | Recycle property | Capacity (mAh) |
|---|---|---|---|---|
| 19 | 4.20 | — | Maintaining 81.23% after 400 recycles | 610 |
| 20 | 4.30 | — | Maintaining 80.72% after 400 recycles | 675 |
| 21 | 4.60 | The ratio of positive electrode material to negative electrode material is 1:1.6. | Maintaining 78.32% after 400 recycles | 912 |
| 22 | 5.80 | The ratio of positive electrode material to negative electrode material is 1:2.5, and substance A is added into the electrolyte solution. | Maintaining 75.83% after 400 recycles | 879 |
| 23 | 5.90 | The ratio of positive electrode material to negative electrode material is 1:2.7, and substance A is added into the electrolyte solution. | Maintaining 47.53% after 50 cycles | 796 |

Examples 19-23 show that when using lithium nickel oxide as positive electrode active material, the cells obtain the results similar to those of examples 1-16. Namely, when the charge voltage is elevated above 4.2 V, the capacity, operating voltage and weight specific energy increase with the elevation of the charge voltage; and when the charge voltage is elevated above 4.45 V, the capacity, operating voltage and weight specific energy continuously increase with the elevation of the charge voltage and of the ratio of positive electrode material to negative electrode material; but when the charge voltage is greater than 5.8 V, the properties of cell decrease.

Examples 24-28

Using cobalt-doping lithium nickel oxide as positive electrode active material, a secondary lithium ion cell is prepared according to the aforesaid method for preparing the secondary lithium ion cells using lithium cobalt oxide as positive electrode active material, wherein the positive electrode slurry consists of 4 g lithium nickel oxide, 0.2 g carbon black, 0.2 g PVDF, and 4.80 g NMP, and the negative electrode slurry consists of 3.5 9 MCMB, 0.35 g PVDF, and 4.0 g NMP. The cell is a quadrate type 063048 lithium ion cell. The data of experiments are depicted in Table 4.

TABLE 4

| Example | Charge cut-off voltage (V) | Processing change | Recycle property | Capacity (mAh) |
|---|---|---|---|---|
| 24 | 4.20 | — | Maintaining 81.23% after 400 recycles | 623 |
| 25 | 4.30 | — | Maintaining 80.72% after 400 recycles | 682 |
| 26 | 4.60 | The ratio of positive electrode material to negative electrode material is 1:1.6. | Maintaining 78.32% after 400 recycles | 934 |
| 27 | 5.80 | The ratio of positive electrode material to negative electrode material is 1:2.5, and substance A is added into the electrolyte solution. | Maintaining 75.83% after 400 recycles | 919 |
| 28 | 5.90 | The ratio of positive electrode material to negative electrode material is 1:2.7, and substance A is added into the electrolyte solution. | Maintaining 39.53% after 50 cycles | 697 |

Examples 24-28 show that when using cobalt-doping lithium nickel oxide as positive electrode active material, the cells obtain the results similar to those of examples 1-21. Namely, when the charge voltage is elevated above 4.2 V, the capacity, operating voltage and weight specific energy increase with the elevation of the charge voltage; and when the charge voltage is elevated above 4.45 V, the capacity, operating voltage and weight specific energy continuously increase with the elevation of the charge voltage and of the ratio of positive electrode material to negative electrode material; but when the charge voltage is greater than 5.8 V, the properties of cell decrease. In the meantime, these results indicate that the present method is not limited to some specific lithium-containing composite oxides as positive electrode material, but can be widely used in various secondary lithium ion cells.

The present method can be used in the production of lithium ion cell and for improvement of relevant products in the following aspects.

1. After adjustment of ratio of positive electrode material to negative electrode material so that the single lithium ion cell obtains the optimal capacity calculated by theoretical specific energy, a secondary lithium ion cell having high capacity and excellent recycle property can be obtained by controlling the charge cut-off voltage within a range from 4.2 V to 5.8 V during the formation and test of the cell. The merits of this method lie in that the specific energy and average operating voltage are greatly improved without substantially increasing the cost and simultaneously with the effects that the original formation process should achieve. Thus, as to the manufacturer of lithium ion cell, the profit margin and the competitiveness of enterprise are improved: and as to the products using lithium ion cells, their performances are improved with the increase of capacity and average operating voltage of the lithium ion cells.

2. The protecting circuit of single secondary lithium ion cell based on the present invention possesses an overcharge release voltage of greater than 4.15 V, and an overcharge first protection voltage of greater than 4.35 V.

3. The single lithium ion cell prepared according to the present invention can combine with the aforesaid protecting circuit having the technical features of the present invention and form a secondary lithium ion cell or battery.

4. The protecting circuit having the technical features of the present invention can be used in a mobile electronic device and product having a secondary lithium ion cell or battery as energy source.

The technology of the present invention possesses a great commercial value for improving the capacity, average operating voltage and specific energy of the secondary lithium ion cell, and makes a certain contribution to the research of the basic theory of lithium ion cell. It is believable that the present technology could improve the development of the whole secondary lithium ion cell industry.

The invention claimed is:

1. A method for improving the capacity, average operating voltage and specific energy of a secondary lithium ion cell or battery, characterized in that the charge cut-off voltage of the secondary lithium ion cell or battery is greater than 4.2 V but less than 5.8 V; and a ratio of positive electrode material to negative electrode material of the secondary lithium ion cell or battery is from 1:1.0 to 1:2.5 as calculated by a specific capacity with a charge voltage limited to 4.2 V.

2. A method according to claim 1, characterized in that the charge cut-off voltage of the secondary lithium ion cell or battery is within a range from 4.3 V to 5.2 V.

3. A method according to claim 1, characterized in that the charge cut-off voltage of the secondary lithium ion cell or battery is within a range from 4.3 V to 4.8 V.

4. A method according to claim 1, characterized in that the ratio of positive electrode material to negative electrode material of the secondary lithium ion cell or battery is from 1:1.15 to 1:2.5.

5. A secondary lithium ion cell or battery, characterized in that the secondary lithium ion cell or battery has a charge cut-off voltage of greater than 4.2 V but less than 5.8 V, and a ratio of positive electrode material to negative electrode material of the secondary lithium ion cell or battery is from 1:1.0 to 1:2.5, as calculated by a theoretic capacity with a charge cut-off voltage set at 4.2 V.

6. A secondary lithium ion cell or battery according to claim 5, characterized in that the secondary lithium ion cell or battery has a charge cut-off voltage within a range from 4.3 V to 5.2 V.

7. A secondary lithium ion cell or battery according to claim 5, characterized in that the secondary lithium ion cell or battery has a charge cut-off voltage within a range from 4.3 V to 4.8. V.

8. A secondary lithium ion cell or battery according to claim 5, characterized in that the ratio of positive electrode material to negative electrode material of the secondary lithium ion cell or battery is from 1:1.15 to 1:2.5.

9. A secondary lithium ion cell or battery according to claim 5, characterized in that the secondary lithium ion cell or battery has a first overcharging protection voltage of greater than 4.35 V, and an overcharging protection release voltage of greater than 4.15 V.

10. A secondary lithium ion cell or battery according to claim 9, characterized in that the secondary lithium ion cell or battery has a first overcharging protection voltage of greater than 4.45 V, and an overcharge protection release voltage of greater than 4.25 V.

11. A secondary lithium ion cell or battery according to claim 5, wherein the secondary lithium ion cell or battery maintains at least 7500 of capacity after 400 cycles.

12. A secondary lithium ion cell or battery according to claim 5, wherein the secondary lithium ion cell or battery maintains at least 75.83% of capacity after 400 cycles.

13. A secondary lithium ion cell or battery according to claim 5, wherein the secondary lithium ion cell or battery maintains at least 80% of capacity after 400 cycles.

14. A secondary lithium ion cell or battery according to claim 5, wherein the secondary lithium ion cell or battery maintains at least 80.72% of capacity after 400 cycles.

15. A method according to claim 1, wherein the secondary lithium ion cell or battery maintains at least 75% of capacity after 400 cycles.

16. A method according to claim 1, wherein the secondary lithium ion cell or battery maintains at least 75.83% of capacity after 400 cycles.

17. A method according to claim 1, wherein the secondary lithium ion cell or battery maintains at least 80% of capacity after 400 cycles.

18. A method according to claim 1, wherein the secondary lithium ion cell or battery maintains at least 80.72% of capacity after 400.

* * * * *